No. 607,679.  
E. CANCIENNE.  
SLING TRIP.  
(Application filed Mar. 26, 1898.)  
Patented July 19, 1898.
(No Model.)
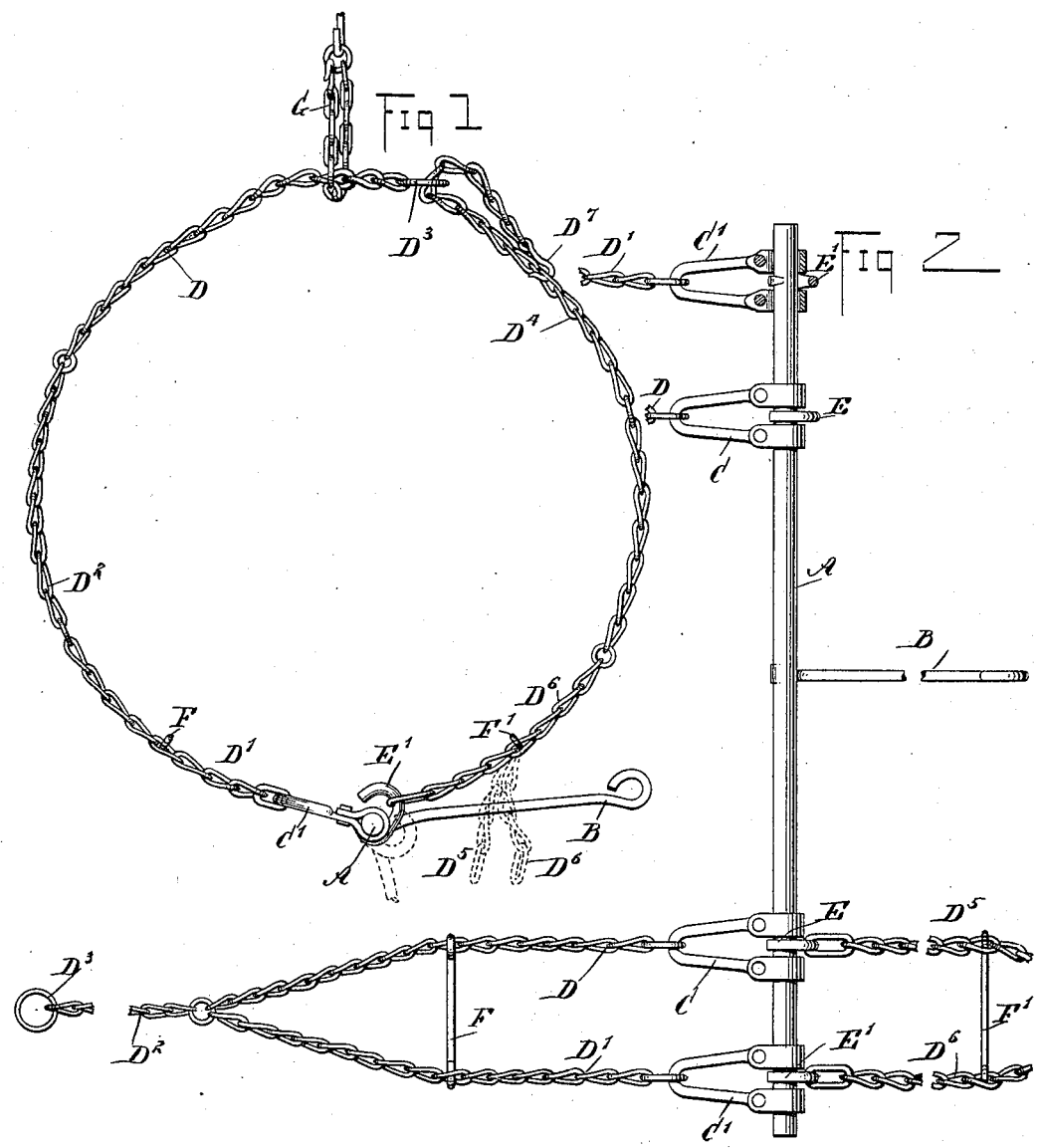
WITNESSES:
INVENTOR  
E. Cancienne  
BY  
ATTORNEYS.

UNITED STATES PATENT OFFICE.

EMA CANCIENNE, OF ALBEMARLE, LOUISIANA.

SLING-TRIP.

SPECIFICATION forming part of Letters Patent No. 607,679, dated July 19, 1898.

Application filed March 26, 1898. Serial No. 675,294. (No model.)

*To all whom it may concern:*

Be it known that I, EMA CANCIENNE, of Albemarle, in the parish of Assumption and State of Louisiana, have invented a new and Improved Sling-Trip, of which the following is a full, clear, and exact description.

The invention relates to devices for unloading sugar-cane and other bulky material from carts, wagons, or other vehicles onto cars, overhead trolleys, platforms, and cane carriers or conveyers.

The object of the invention is to provide a new and improved sling-trip which is simple and durable in construction, very effective in operation, and arranged to readily hold the load and transfer the same to a car, conveyer, or other device and to then permit of conveniently tripping the sling-chains to discharge the load from the sling.

The invention consists of novel features and parts and combinations of the same, as will be described hereinafter and then pointed out in the claims.

Reference is to be had to the accompanying drawings, forming a part of this specification, in which similar characters of reference indicate corresponding parts in both the figures.

Figure 1 is a side elevation of the improvement in position for holding a load; and Fig. 2 is a plan view of the same in position for receiving the load, parts being in section.

The improved sling-trip is provided with a bar A, carrying at or near its middle a handle B, and on each end is arranged a pair of loops C C', mounted to rotate loosely on the bar A. The loops C C' of each pair connect with branch chains D D', spread apart by a cross-bar F and terminating in a single chain $D^2$, carrying at its end a ring $D^3$, through which is adapted to pass a chain $D^4$, similar to chain $D^2$, and provided with branch chains $D^5 D^6$, spread apart by a cross-bar F' and adapted to be hooked into the hooks E E', respectively. The outer end of the chain $D^4$ is provided with a hook $D^7$, adapted to be hooked into one of the links of the chain $D^4$ after the hook end is passed through the ring $D^3$ and returned, as indicated in Fig. 1. The hooks E E' are rigidly secured to the bar A and extend from the latter in alinement with the handle B, and the hook E is arranged between the two bearing members of the loop C, so as to prevent the latter from moving longitudinally on the bar A, and the hook E' is similarly arranged between the bearing members of the loop C'. Thus the loops and hooks are always held in proper position relatively to one another.

When the device is used, the bar A is placed lengthwise in the bottom of the cart or other vehicle-body, with the chains $D^2 D^4$ extending in opposite directions over the sides of the cart. When a load has accumulated in the cart, and consequently between the bar and chains, then the free ends of the chains $D^2 D^4$ are brought over the load and the chain $D^4$ is passed through the ring $D^3$ and hooked back upon itself, with the load tightly in the chain. A chain G, connected with a lifting device and carrier, is now passed on the closed chain, as shown in Fig. 1. The load can now be readily transferred from the cart to a car, overhead trolley, platform, cane-carrier, or cane-conveyer, and when the desired position has been reached then the operator by connecting a stick or other device with the eye of the handle B and giving the latter a sudden downward jerk causes a turning of the bar A in the bearings of the loops C C' to disconnect the ends of the chains $D^5 D^6$ from the hooks E E' to open the chains for the load to drop out of the open chains $D^2 D^4$.

It will be seen that the device is very simple and durable in construction, is not liable to get out of order, and permits of quickly tripping the chains and releasing the load whenever it is desired.

Having thus fully described my invention, I claim as new and desire to secure by Letters Patent—

1. A sling-trip comprising a handled bar, loops mounted to turn on the bar, hooks stationary on the bar, and chains, each connected at one end to the loop and adapted to be hooked at its other end to the hook, substantially as shown and described.

2. A sling-trip comprising a handled bar, pairs of loops mounted to turn at the ends of the bar, hooks fixed on the bar between the members of the loops, to hold the same against lateral movement on the bar, and chains of which one is permanently connected at one end to the said loops, and the other is adapted to be hooked at one end to the said hooks, so that upon turning the bar the hooks release their chain, substantially as shown and described.

EMA CANCIENNE.

Witnesses:
GEORGE H. DUGAS,
LEO GUILLOT.